UNITED STATES PATENT OFFICE.

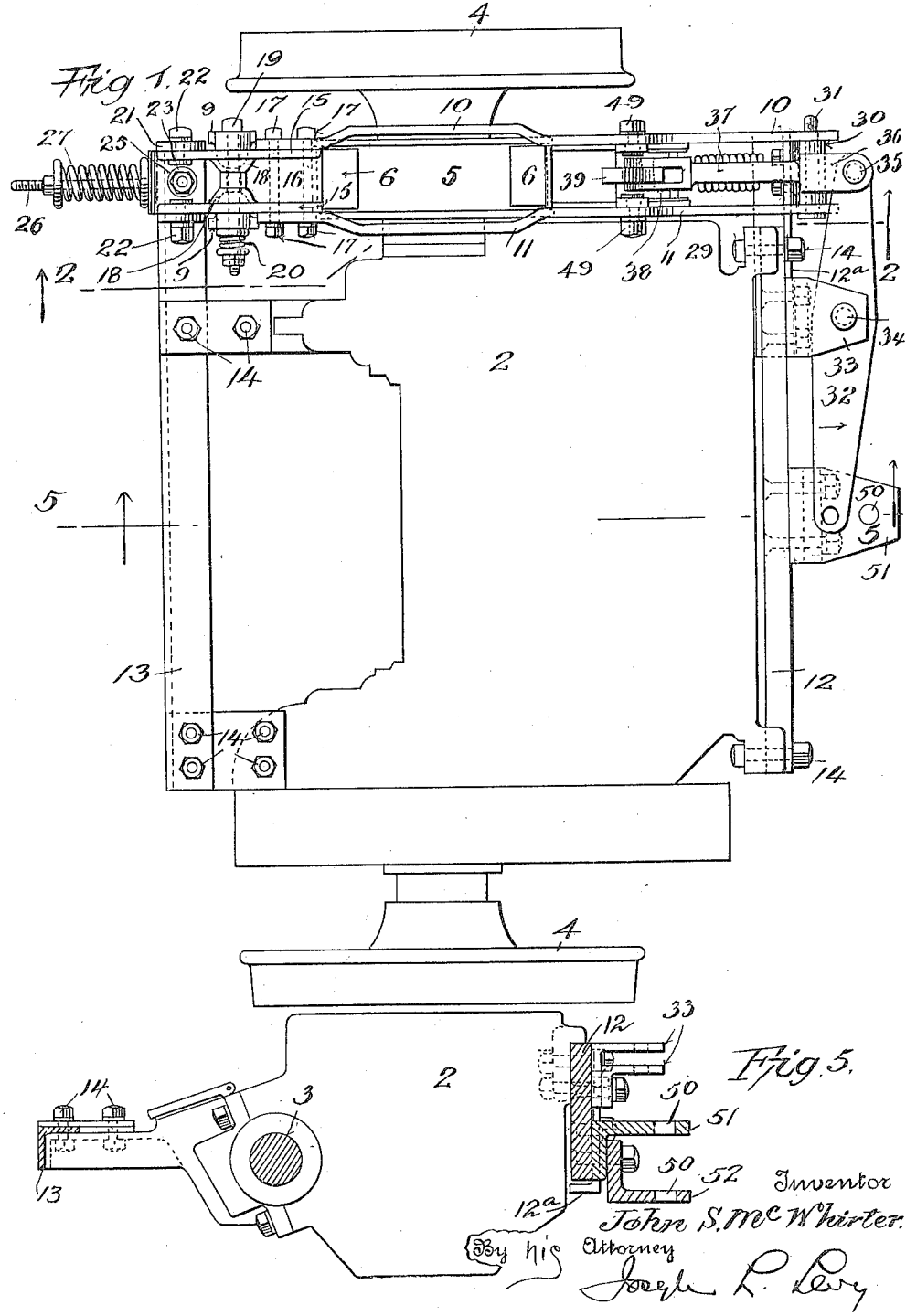

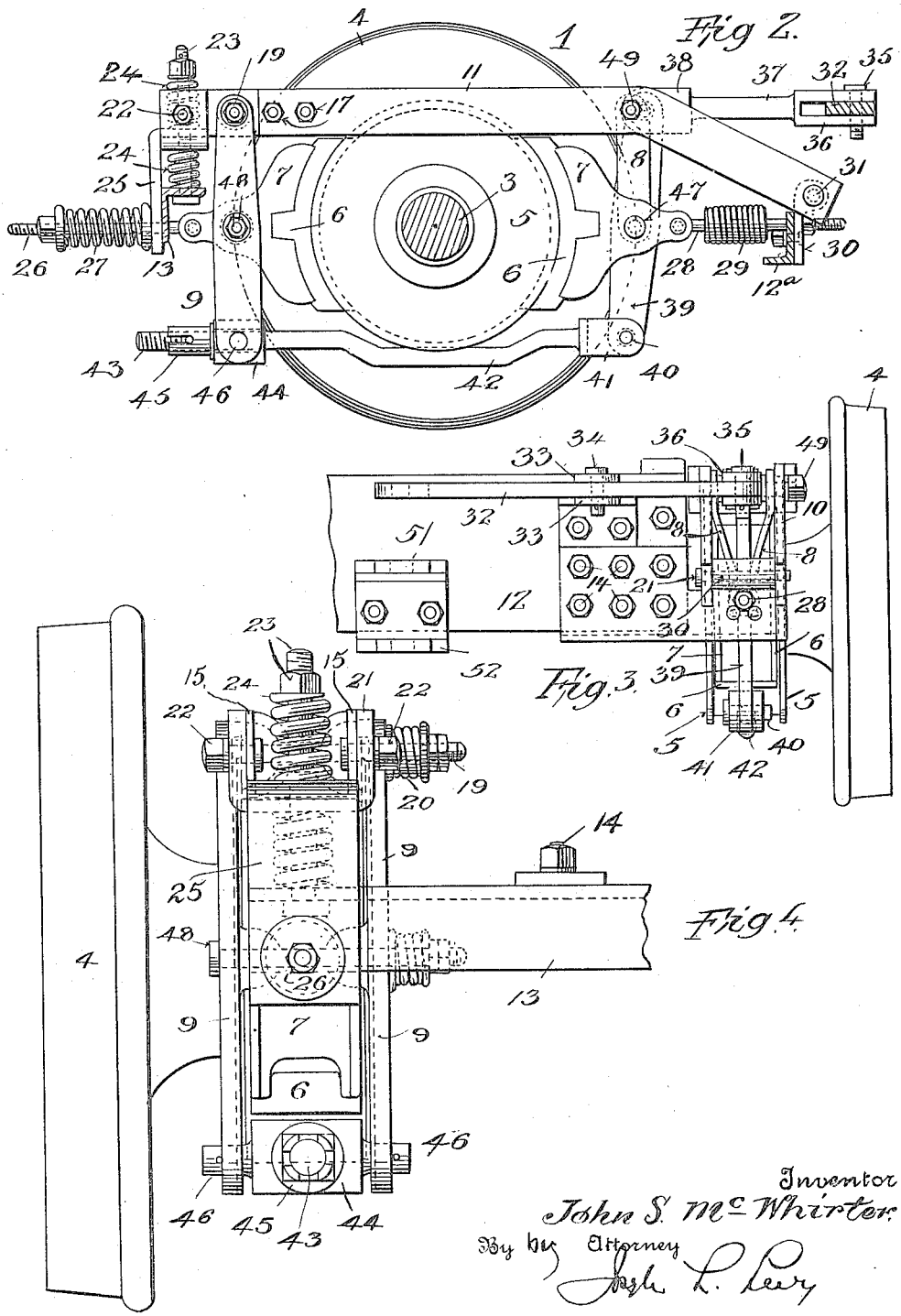

JOHN S. McWHIRTER, OF NEW YORK, N. Y., ASSIGNOR TO THE J. G. BRILL COMPANY, OF PHILADELPHIA, PENNSYLVANIA, A CORPORATION OF PENNSYLVANIA.

BRAKE FOR CARS.

1,213,927.  Specification of Letters Patent.  Patented Jan. 30, 1917.

Application filed December 29, 1915. Serial No. 69,141.

*To all whom it may concern:*

Be it known that I, JOHN S. McWHIRTER, a citizen of the United States, and a resident of the city, county, and State of New York, (whose post-office address is Sixty-fifth street and Third avenue, New York city,) have invented a new and useful Improvement in Brakes for Cars, of which the following is a specification.

The object of my invention is to provide a brake which is suitable for electric cars, and particularly those which carry a low car body. This object is accomplished by my invention wherein, in the preferred embodiment, the brake rigging is carried by the motor casing mounted on the axle, and the brake shoes are applied to a drum which is mounted on the axle and fixed thereto so that the brake is always applied to the drum and never to the wheels, whereby all strain on the axle bearings is eliminated, the life of the wheels is not reduced by the usual wear, incidental to brake shoes being applied thereto, and the brake is made much lighter and more compact than is customary in such structures. These and other advantages are accomplished by my invention, one embodiment of which is hereinafter set forth.

For a more particular description of my invention, reference is to be had to the accompanying drawings forming a part hereof, in which—

Figure 1 is a plan view of a motor casing carrying my improved brake mechanism. Fig. 2 is a sectional view, taken on the line 2—2 of Fig. 1, looking in the direction of the arrows. Fig. 3 is an end elevation of my improved brake mechanism, parts of a motor casing and a car wheel being shown. Fig. 4 is an enlarged view of parts of the said brake mechanism and parts adjacent thereto, the view being taken in the opposite direction from the view taken of Fig. 3. Fig. 5 is a sectional view, taken on the line 5—5 of Fig. 1, looking in the direction of the arrows.

Throughout the various views of the drawings, similar reference characters designate similar parts.

My improved brake 1 is carried from a motor casing 2, which is sleeved in the conventional manner on an axle 3 which is fixed to the wheels 4, in the usual way. Between the motor casing 2 and one of the wheels 4, a drum 5 is fixed to the axle 3, so that the brake shoes 6 may be applied to this drum instead of the wheel 4.

In the preferred embodiment of my invention, two brake shoes 6 are employed and these shoes are placed at diametrically opposite points of the drum 5 and carried in suitable brake shoe heads 7, in the conventional manner, and these heads are supported by suitable hangers 8 at one side and the levers 9 at the other. The hangers 8 and the levers 9 are hung from the parallel bars 10 and 11 which are carried by and secured to the transverse bars 12 and 13 respectively which are fixed to the motor casing 2 by bolts 14, or any other suitable means. The bar 12 is flat at its center portion, and this flat portion extends as far as the outside of the motor casing 2. Secured to the end of the bar 12 is an angle bar 12ᵃ. The bars 10 and 11 are not integral throughout in the embodiment of my invention shown in Fig. 1, but are divided into two parts near the levers 9, and these parts are connected by a web or filler 16, and the parts 15 are connected by this filler 16 through which the bolts 17 pass that hold together, and in proper relation, the bars 10 and 11 and the ends 15. These ends 15 are provided with suitable cups 18 to receive corresponding projections on the levers 9 and form therewith a ball and socket joint, the bolts and sockets being kept together in suitable position by means of the bolt 19 on which is mounted a suitable coil spring 20, in the conventional manner. The extreme ends of the extensions 15 are connected to the bar 13 by means of a U 21 secured by suitable bolts 22, one at each end, and through the center of the U is a perforation through which passes a bolt 23 on which are two coil springs 24, one above and one below the U 21, and the bolt 23 passes through a suitable perforation in the bar 13 so that at one end of the parallel bars 10 and 11, they are spring supported and free to partake of the vertical movement of the axle as it shifts in the pedestals of the truck whereby the brake mechanism can always be supported at the proper level. An inverted L-shaped member 25 rests on the central portion of the U 21 and the bolt 23 passes through the horizontal leg of the member 25. At the lower end of the vertically extending leg of the member 25 is a perforation through which passes a bolt 26, on which is mounted a suitable coil spring 27, so that said spring 27 holds the brake shoe 6 away from the drum 5, and the member 25 holds the bolt 26 in proper alinement with the shoe holder 7. The lever 9, under the action of the springs slides against the bar 13, which thus limits the pull of the retracting spring 27. A two part bolt 28 with its two parts connected by a coil spring 29 is connected in a similar way to the other brake shoe holder 7 and this bolt 28 passes through a suitable perforation in the angle bar 12$^a$ which supports its free end. The spring 29 is expanded when the brake shoes are applied and withdraws them when released. The angle bar 12$^a$ also carries a suitable bracket 30 in which is mounted, at its upper end, a suitable pin 31 on which are placed the two extreme and downwardly extending ends of the bars 10 and 11 so that the same are pivotally supported in parallel relation from the angle bar 12$^a$, the bracket 30 serving to keep these bars separated and in proper position one with regard to the other.

The brake is actuated by means of a suitable lever 32 pivotally mounted in suitable ears 33 by means of a fulcrum or pin 34, and the other end of this lever 32 runs to a second pin 35 which pivotally connects this lever 32 with a clevis 36 at one end of a rod 37, and the other end of this rod has a second clevis 38 in which is a pin which connects this rod 37 to a vertical lever 39. The lower end of this lever 39 is provided with a suitable pin 40 which connects the lower end of this lever 39 to a clevis 41 on a link 42 which has one end 43 provided with suitable screw threads, and carried on the screw-threaded end 43 is a suitable sleeve 44, the position of which is controlled by a lock-nut 45, and this sleeve rests between the two levers 9 and is connected thereto by means of suitable projections or pins 46.

The free end of the motor casing 2 is supported by means of a projection from a car body or truck frame provided with a pin passing through the opening 50 in the ears 51 and 52 which are fixed to the bar 12.

The links 8 and the levers 9 are connected to the brake shoe holders 7 by means of a pin 47 and a bolt 48 respectively. The bolt 48 has suitable connections corresponding to those on the bolt 19 such as ball and socket joints, spring, etc., and the pin 47 not only passes through the links 8 but also through the lever 39 and forms a fulcrum for the same as will appear below. The upper ends of the links 8 are connected to the parallel bars 10 and 11 by means of suitable bolts 49 which may be secured in any suitable way.

The brake is applied as follows: Assuming the parts to be as shown in Fig. 1, when the inner end of the lever 32 is pulled to the right, this lever swings on its fulcrum 34 and forces its other end, with its pin 35, to the left. The pin 35 forces the link 37 and the upper end of the lever 39 to the left thereby forcing one brake shoe 6 against the drum 5, and against the tension of spring 29, and the lever 39 swings on the pin 47 as a fulcrum and through the connections above described draws the lower end of the lever 9 to the right, as will be clear from Fig. 2. This lever draws the brake shoe 6 on the left against the drum 5 and against the tension of the spring 27, so that the brake shoes 6 are pulled in opposite directions against the drum 5 at diametrically opposite points so that no strain whatever is put on the bearings when the brakes are applied. There is a slight tendency of the brake shoes to rotate in the direction in which the drum 5 rotates but this is entirely provided for by the connections above described, so that the brake shoes, under all conditions of service, bear true upon the drum and against the same, as above set forth. It will be observed that this braking mechanism is supported directly from the axle through the motor casing and is always carried in proper relation to the axle, regardless of the relative positions of other parts of the car, so that this braking mechanism is particularly adapted for radiating car trucks. It is to be further observed that the space occupied by the brake mechanism is exceedingly limited so that it may be applied with advantage to low cars, and particularly those low cars which have radiating axles.

While I have shown and described one embodiment of my invention, it is obvious that it is not restricted thereto, but is broad enough to cover all structures that come within the scope of the annexed claims.

Having thus described my invention, what I claim is:

1. In a brake, a motor casing, an axle on which the motor casing is sleeved, a drum on the axle and fixed thereto, and braking mechanism supported from the motor casing and applied to the drum.

2. In a brake mechanism, an axle, a drum fixed thereon, a motor-casing sleeved to said axle, parallel bars adjacent to one end of said motor-casing and above said axle, means for supporting said parallel bars from said motor-casing, brake shoes adapted to engage said drum, and mechanism for supporting said brake shoes from said parallel bars.

3. In a brake mechanism, an axle, a drum mounted thereon, a motor-casing sleeved on said axle, parallel bars at one end of said motor-casing and above said axle, means for supporting said bars from said motor-casing, brake shoes and means for suspending the same from said parallel bars, and mechanism for causing said brake shoes to simultaneously engage said drum at opposite points when the brake is applied, and to disengage said drum when the brake is released.

4. In a brake mechanism, an axle, a drum fixed thereon, parallel bars above said axle and adjacent to said drum, means for supporting said bars from said axle, brake shoes adjacent to said drum, brake shoe holders holding said brake shoes, hangers supporting one of said holders and levers supporting the other of said holders, a live lever and a link connecting the same with the said first mentioned levers, and means for withdrawing the brake shoes from the drum after the brake has been applied.

5. In a brake mechanism, an axle, a motor casing sleeved thereon, transverse bars secured to said motor-casing, and parallel bars supported by said transverse bars, said parallel bars being connected to one transverse bar by pivotal means and to the other transverse bar by resilient means.

6. In a brake mechanism, an axle, a motor casing sleeved thereon, transverse bars running from said motor casing, parallel bars supported by said transverse bars, brake shoes, brake shoe holders secured to said brake shoes, mechanisms for supporting said brake shoe holders from said parallel bars, release springs, bolts connecting said release springs to said brake shoe holders and means for causing said release springs to draw said brake shoe holders toward said transverse bars.

7. In a brake mechanism, an axle, a motor casing sleeved on said axle, transverse bars secured to said motor casing, parallel bars supported by said transverse bars, brake shoes and holders supported by said parallel bars, a horizontal lever fulcrumed in ears secured to one of said transverse bars and means connecting the horizontal lever to the brake shoes and holders so that they may be operated thereby.

Signed at the city of New York, county of New York, and State of New York, this 29 day of September, 1915.

JOHN S. McWHIRTER.

Copies of this patent may be obtained for five cents each, by addressing the "Commissioner of Patents, Washington, D. C."